Patented Oct. 8, 1946

2,408,832

UNITED STATES PATENT OFFICE 2,408,832

PSEUDOKRYPTOGENIN AND ITS DIACETATE

Romeo B. Wagner, State College, Pa., assignor to Parke, Davis & Company, Detroit, Mich., a corporation of Michigan No Drawing. Application May 15, 1944,
Serial No. 535,756

4 Claims. (Cl. 260—239.5)

This invention relates to the preparation of new pseudo-sapogenins from certain steroidal sapogenins which are described in J. Am. Chem. Soc. 65, 1199 (1943). These compounds are valuable as intermediates for the preparation of hormones of the sex hormone type and particularly of the adrenal cortex hormone type since they are oxygenated at position 12 of the steroid nucleus.

The reaction by which steroidal sapogenins are isomerized to the pseudo-genins have been described in detail in the copending Patents Nos. 2,352,848 and 2,352,852, issued July 4, 1944. These also include proof of structure of the pseudo-genin side chain.

This invention relates to the preparation of pseudo-genin compounds having the formula,

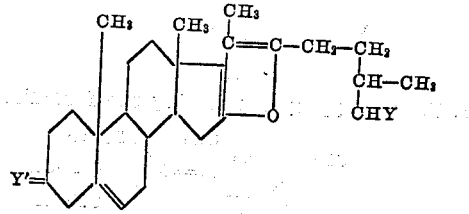

where Y and Y' are members of the class

and groups hydrolyzable to

I have found that three sapogenins, Pennogenin, nologenin and kryptogenin (see J. Am. Chem. Soc., 65 1199, 1943), when treated under the conditions described in Patents Nos. 2,352,848 and 2,352,852 for isomerizing to pseudo-genins, are converted into the same pseudo-genin, namely, pseudo-kryptogenin.

The invention may be illustrated by the following examples.

*Pseudokryptogenin (from kryptogenin)*

A solution of 5 grams of kryptogenin diacetate in 15 cc. of acetic anhydride is heated at 200° C. in a sealed tube for 10 hours. The solvent is removed in vacuo and the residue hydrolyzed with excess potassium bicarbonate (or alcoholic potash) in aqueous ethanol. The product is ether extracted, crystallized from acetone and then re-crystallized from ether to give pseudokryptogenin, M. P. 189–192° C. A mixture of this product with kryptogenin melts at 162–167° C.

Anal.: Calc'd. for $C_{27}H_{40}O_3$: C, 78.6; H, 9.8%. Found: C, 78.5; H, 9.8%.

Treatment of pseudo-kryptogenin with hot ethanolic hydrochloric acid converts it back into kryptogenin. The pseudo-kryptogenin of this example has the formula,

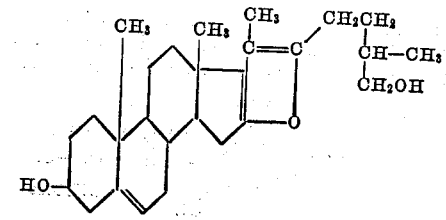

Pseudo-kryptogenin

*Pseudokryptogenin (from pennogenin)*

A mixture of 6 grams of pennogenin acetate in 18 cc. of acetic anhydride is heated at 200° C. for 10 hours. The mixture is evaporated in vacuo on the steam bath and then re-evaporated with ethanol to remove the remaining acetic anhydride. After decolorizing a methanol solution of the residue with charcoal ("Norite" brand), the product is crystallized from methanol and has M. P. 68–73° C. It is further purified by hydrolysis with 5% ethanolic potash and crystallization from ether and then methanol to give a product of M. P. and mixed M. P. with pseudo-kryptogenin of 192–193° C.

Anal.: Calc'd. for $C_{27}H_{40}O_3$: C, 78.6%; H, 9.8%. Found: C, 77.9%; H, 9.6%.

The diacetate is prepared by refluxing pseudo-kryptogenin with acetic anhydride, and crystallized from methanol to give material of M. P. 120–125° C. Recrystallization from methanol gives material of M. P. 115–125 and 124–126° C.

Anal.: Calc'd for $C_{31}H_{44}O_5 \cdot CH_3OH$: C, 72.7; H, 9.2%. Found: C, 72.5; H, 8.6%.

In a second run, the product from 20 g. of pennogenin acetate and 25 cc. of acetic anhydride is hydrolyzed directly and then crystallized from acetone to give 11 g. of pseudokryptogenin.

The transformations of this example may be illustrated as follows:

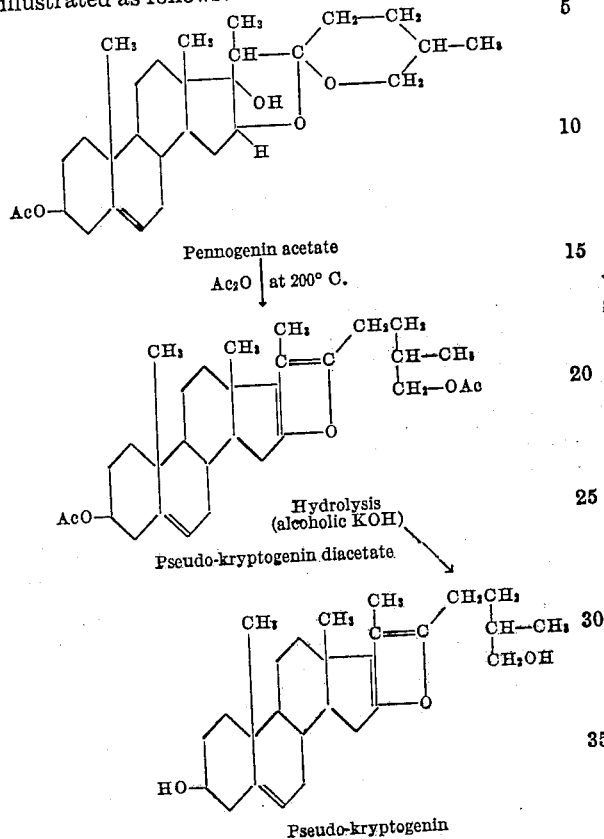

Pennogenin acetate

Pseudo-kryptogenin diacetate

Pseudo-kryptogenin

*Pseudokryptogenin (from nologenin)*

This example is carried out under the same conditions as the other examples but starting with nologenin diacetate which has the formula,

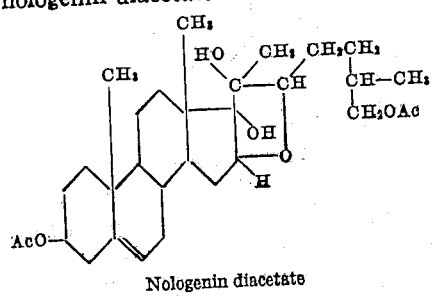

Nologenin diacetate

The same products, pseudokryptogenin and its diacetate are obtained.

While for ease of manipulation and economy the preferred isomerizing agent is acetic anhydride, other lower aliphatic acid anhydrides may also be used. The preferred temperature range lies between 190° and 200° C. although the reaction also takes place as low as 170° or as high as 230°. The example is intended as illustrative and the invention is not necessarily limited to the conditions and reactants therein cited.

In addition to using ethanolic KOH solution for hydrolyzing the acylated pseudogenin to the free genin, one can use any other suitable alkaline solution, for example one containing NaOH, $K_2CO_3$, $KHCO_3$, $Na_2CO_3$, $NaHCO_3$ or the like. If an alcohol is required to aid hydrolysis, this can be methanol or other lower aliphatic alcohol instead of ethanol.

What I claim is:

1. Compounds having the formula,

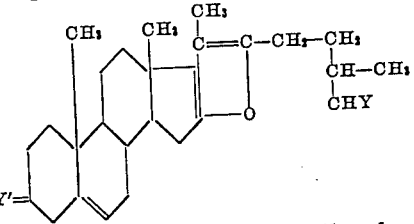

where Y and Y' are members of the class consisting of $$\begin{matrix} OH \\ \diagdown \\ H \end{matrix}$$

and groups hydrolyzable to $$\begin{matrix} OH \\ \diagdown \\ H \end{matrix}$$

2. Compounds having the formula

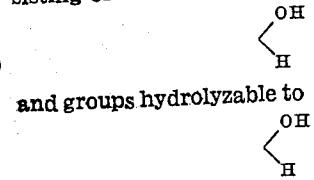

where Y and Y' are members of the class consisting of $$\begin{matrix} OH \\ \diagdown \\ H \end{matrix}$$

and organic carboxylic acid ester groups hydrolyzable to $$\begin{matrix} OH \\ \diagdown \\ H \end{matrix}$$

3. Pseudokryptogenin having the formula,

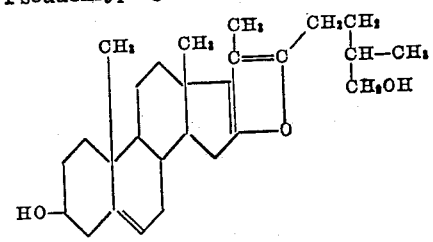

4. Pseudokryptogenin diacetate having the formula,

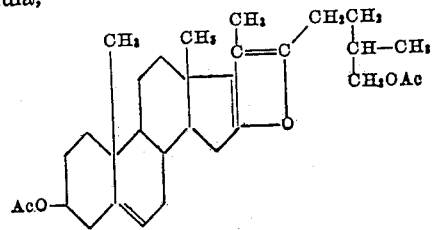

ROMEO B. WAGNER.